United States Patent
Scriba et al.

(10) Patent No.: US 10,494,008 B1
(45) Date of Patent: Dec. 3, 2019

(54) AUXILIARY CONTAINER FOR A SHOPPING CART

(71) Applicant: Wiremasters, Inc., Chicago, IL (US)

(72) Inventors: Paul Scriba, Western Springs, IL (US); Mark Nelson, Wheeling, IL (US); James Street, Chicago, IL (US); Kevin Meyers, Chicago, IL (US)

(73) Assignee: Wiremasters, Inc., Chicago, IL (US)

( * ) Notice: Subject to any disclaimer, the term of this patent is extended or adjusted under 35 U.S.C. 154(b) by 0 days.

(21) Appl. No.: 16/054,642

(22) Filed: Aug. 3, 2018

(51) Int. Cl.
  *B62B 3/14* (2006.01)
  *B62B 3/02* (2006.01)
  *B62B 3/18* (2006.01)

(52) U.S. Cl.
  CPC ............ *B62B 3/1468* (2013.01); *B62B 3/182* (2013.01); *B62B 3/02* (2013.01)

(58) Field of Classification Search
  CPC ............... B62B 3/1464; Y10S 224/926; A45C 13/1038; A45C 2013/1061; A45C 7/00; A45C 2007/0013
  See application file for complete search history.

(56) References Cited

U.S. PATENT DOCUMENTS

| | | | |
|---|---|---|---|
| 1,577,298 A | 3/1926 | Roeller | |
| 2,761,481 A * | 9/1956 | Boatwright | A61G 7/0503 383/22 |
| 3,976,113 A * | 8/1976 | Kim | A45C 9/00 383/4 |
| 4,240,480 A * | 12/1980 | Strobel | A45C 3/00 383/13 |
| 4,491,257 A | 1/1985 | Ingles | |
| 4,676,416 A | 6/1987 | Harmon | |
| 4,723,300 A * | 2/1988 | Aranow | A45C 7/00 190/1 |
| 4,830,238 A * | 5/1989 | Widinski | B62B 9/26 224/409 |
| 4,974,760 A | 12/1990 | Miller | |
| 4,988,216 A * | 1/1991 | Lyman | A45C 11/20 383/110 |
| 5,012,963 A | 5/1991 | Rosenbaum | |
| 5,012,966 A | 5/1991 | Turner et al. | |
| 5,040,711 A | 8/1991 | Niederhauser et al. | |
| D324,504 S | 3/1992 | Olsen | |
| 5,110,219 A * | 5/1992 | Lopes | A45C 3/10 190/2 |
| 5,139,308 A * | 8/1992 | Ziman | A47C 4/52 224/155 |
| 5,417,353 A | 5/1995 | Stall | |
| D366,903 S | 2/1996 | Baggott | |
| 5,494,308 A | 2/1996 | Southerland | |
| 5,533,809 A * | 7/1996 | Gorman | B65D 33/14 206/320 |
| 5,699,564 A * | 12/1997 | Heh | A47D 15/00 220/495.1 |
| D420,510 S * | 2/2000 | Rotan | D3/201 |
| 6,056,178 A | 5/2000 | Rapp-Duncan | |
| 6,105,305 A * | 8/2000 | Edens | A01K 97/20 224/406 |

(Continued)

*Primary Examiner* — Brian D Nash
(74) *Attorney, Agent, or Firm* — Cook Alex Ltd.

(57) ABSTRACT

An improved auxiliary container for connection to a shopping cart is disclosed. The auxiliary container provides specialized capacity for small items, while providing numerous advantages to retailers and users.

18 Claims, 5 Drawing Sheets

(56) References Cited

U.S. PATENT DOCUMENTS

| | | |
|---|---|---|
| 6,292,963 B1 * | 9/2001 | Couture .............. A47C 21/003 |
| | | 5/485 |
| D451,054 S | 11/2001 | Thom et al. |
| 6,334,562 B1 | 1/2002 | Ament et al. |
| 6,450,513 B1 | 9/2002 | Bernstein |
| D484,666 S | 12/2003 | Caya |
| 6,966,565 B1 | 11/2005 | Ryan et al. |
| 7,475,885 B2 | 1/2009 | Kovath |
| D602,230 S * | 10/2009 | Shooshan ....................... D2/864 |
| D636,075 S * | 4/2011 | Yacoub ........................ D24/118 |
| 8,056,909 B2 | 11/2011 | Burdwood et al. |
| 9,221,511 B2 * | 12/2015 | Jack ........................ B62J 9/003 |
| 2005/0212235 A1 | 9/2005 | Hammerling |
| 2006/0022005 A1 | 2/2006 | Chadwick |
| 2006/0049591 A1 | 3/2006 | Pennell |
| 2015/0246751 A1 * | 9/2015 | Spivack ................. B65D 31/12 |
| | | 224/411 |
| 2016/0129927 A1 | 5/2016 | Russell et al. |
| 2018/0220760 A1 * | 8/2018 | Lin ........................ A45C 3/001 |

* cited by examiner

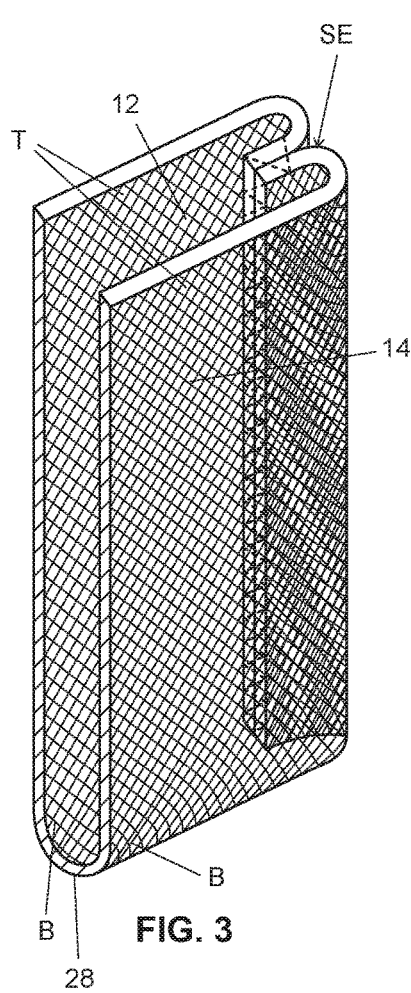
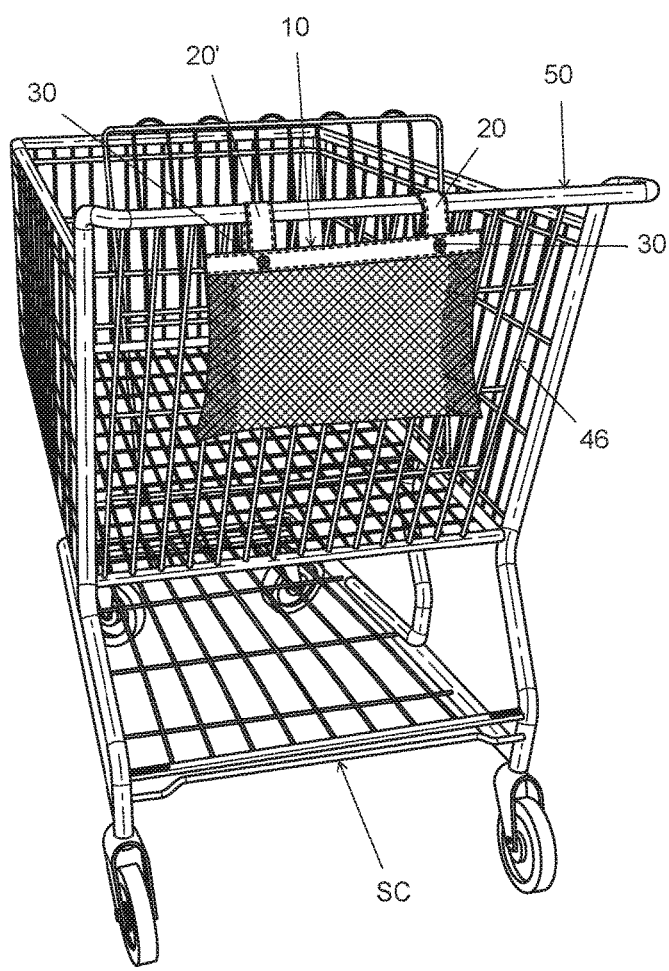
FIG. 3
FIG. 5

AUXILIARY CONTAINER FOR A SHOPPING CART

BACKGROUND OF THE INVENTION

Field of the Disclosure

This disclosure relates generally to accessories for shopping carts and, more particularly, to auxiliary containers that provide specialized capacity for a shopping cart.

Discussion of the Prior Art

Shopping carts are widely used by the general public in a variety of shopping environments. It is common for such carts to be constructed of metal wire or rods welded into grid patterns and connected to a tubular frame, or constructed of plastic molded panels connected to a tubular plastic or metal frame, or the like. The carts also typically include multiple wheel assemblies for ease of traveling through a store and outdoors, such as to unload a cart into a vehicle after shopping.

Unfortunately, shopping carts tend to share a common shortcoming with respect to failing to provide a good way to hold smaller items. This failure can lead to multiple problems from having small items fall between the wires or rods into the lower basket of the cart or completely through the lower basket and out of the cart, to effectively having small items be passed over and inadvertently left in the cart at the time one seeks to withdraw items from the cart to complete a purchase.

Others have attempted to provide containers that may be attached to shopping carts but such containers tend to have numerous drawbacks. The drawbacks may involve difficulty in attaching the container to a shopping cart, being limited with respect to the locations the container may be connected to a shopping cart and/or interfering with nesting of carts when multiple carts are collected and moved. Other drawbacks of prior art containers may be with respect to accessibility in the sense of the difficultly to add items to or withdraw items from the container. Additional drawbacks may be related to the construction of the container, such as an inability to withstand rough handling or a range of outdoor environmental conditions. Still further drawbacks may relate to materials used to construct the container not being user-friendly with respect to keeping the container clean or free of finger prints, or blocking the view of items within the container.

SUMMARY OF THE INVENTION

The purpose and advantages of the present invention will be set forth in and apparent from the description and drawings that follow, as well as will be learned by practice of the claimed subject matter. The present disclosure provides an improved auxiliary container for connection to a shopping cart that provides specialized capacity for small items. The auxiliary container is constructed with numerous advantages to retailers who will install them on shopping carts and to customers who will use the auxiliary container when it is installed on a shopping cart.

Advantages to retailers include, for example: several optional locations for installation on a shopping cart internally or externally; quick and convenient installation; installation that is less susceptible to criminal removal of the container from the cart; no interference with nesting of multiple shopping carts; excellent resistance to adverse environmental conditions and to smudging or retention of dirt; enhanced durability with respect to wear and providing strategic reinforcement for the opening and areas that might otherwise be subject to overstress and tearing, and reduction in damage to products which may otherwise fall through the cart and inadvertently be damaged, lost or left on the floor.

Advantages to customers using the auxiliary containers include, for example: protection of small and or fragile items from falling through openings in a shopping cart; ease of viewing the items in the container for convenience while shopping, as well as avoidance of inadvertently leaving small items within the cart; durable construction without concern for rough handling or positioning when pushing carts into a nested condition; ease of accessibility when depositing and withdrawing small items; and general cleanliness.

In a first aspect, the present disclosure provides an auxiliary container for a shopping cart, including: first and second walls with each wall having a top, bottom, first end and second end; the bottoms of the first and second walls being connected to each other; the first ends of the first and second walls being connected to each other; the second ends of the first and second walls being connected to each other; a reinforcement band connected along the top of each of the respective first and second walls; at least first and second straps spaced inward from the first and second ends and connected to and extending from the reinforcement band at the top of the first wall; the first strap having at least a first grommet passing through the first strap at a location spaced from the top of the first wall and having at least a second grommet passing through the first strap, the reinforcement band along the top of the first wall, the first wall, the second wall and the reinforcement band along the top of the second wall; the second strap having at least a first grommet passing through the second strap at a location spaced from the top of the first wall and having at least a second grommet passing through the second strap, the reinforcement band along the top of the first wall, the first wall, the second wall and the reinforcement band along the top of the second wall; and wherein an opening to the container is provided between the respective first and second walls and between the respective second grommets.

In another aspect, the present disclosure provides an auxiliary container for a shopping cart, including: first and second walls constructed of flexible mesh material with each wall having a top, bottom, first end and second end; the bottoms of the first and second walls being connected to each other; the first ends of the first and second walls being connected to each other; the second ends of the first and second walls being connected to each other; a reinforcement band constructed of flexible material connected along the top of each of the respective first and second walls; at least first and second straps spaced inward from the first and second ends constructed of flexible material and connected to and extending from the reinforcement band at the top of the first wall; the first strap having at least a first grommet passing through the first strap at a location spaced from the top of the first wall and having at least a second grommet passing through the first strap, the reinforcement band along the top of the first wall, the first wall, the second wall and the reinforcement band along the top of the second wall; the second strap having at least a first grommet passing through the second strap at a location spaced from the top of the first wall and having at least a second grommet passing through the second strap, the reinforcement band along the top of the first wall, the first wall, the second wall and the reinforcement band along the top of the second wall; wherein an opening to the container is provided between the respective first and second walls and between the respective second grommets; and wherein each of the at least first and second straps extending from the reinforcement band at the top of the first wall is configured for connection to a substantially horizontal element of a shopping cart via installation of a fastener through the first and second grommets that extend through the respective strap.

It is to be understood that both the foregoing general description and the following detailed description are exemplary and provided for purposes of explanation only, and are not restrictive of the subject matter claimed. Further features and objects of the present disclosure will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein:

FIG. 3 is a simplified cross-sectional perspective view of a portion of the mesh portion of the auxiliary container of FIG. 1;

FIG. 5 is a rear perspective view of the auxiliary container of FIG. 1 connected at an external location to a main handle of the first example shopping cart;

It should be understood that the drawings are not to scale. While some mechanical details of example auxiliary container for a shopping cart, including other plan and section views of the examples shown and of examples that may have alternative configurations have not been included, such details are considered well within the comprehension of those of ordinary skill in the art in light of the present disclosure. It also should be understood that the present invention is not limited to the example embodiments illustrated.

DETAILED DESCRIPTION

Although the following discloses example auxiliary containers for a shopping cart, persons of ordinary skill in the art will appreciate that the teachings of this disclosure are not limited to the specific embodiments shown. On the contrary, it is contemplated that the teachings of this disclosure may be implemented in alternative configurations and environments.

Figure 1:
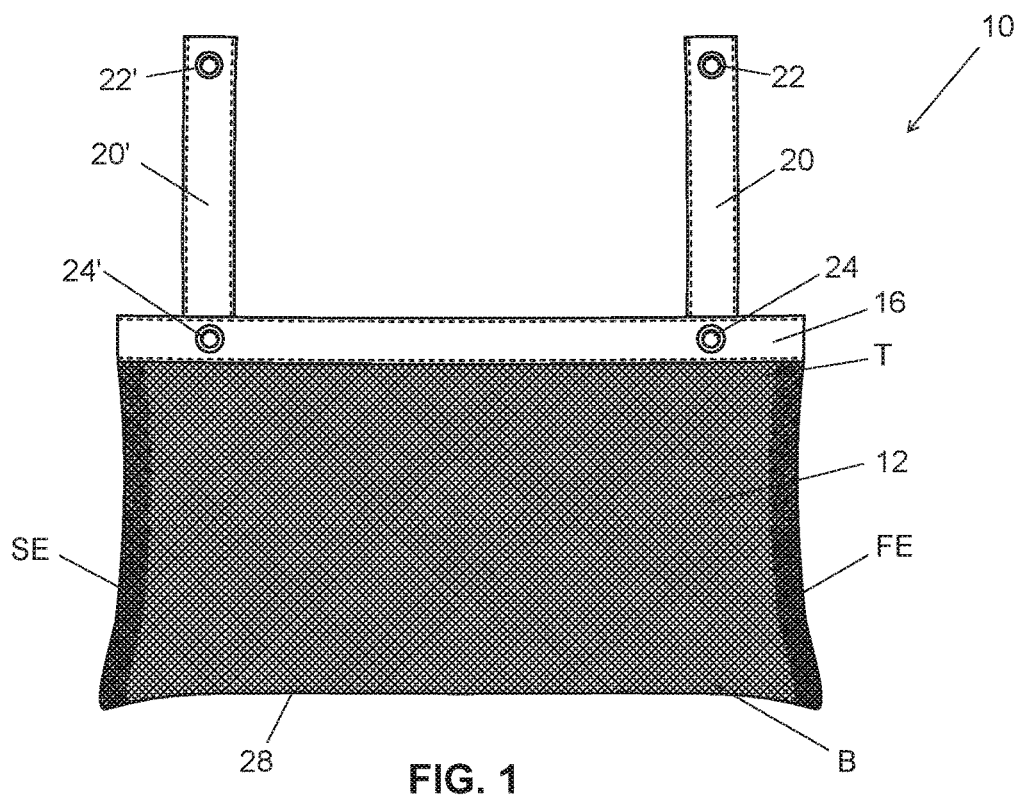
FIG. 1 is a front view of an example auxiliary container for a shopping cart.
Figure 2:
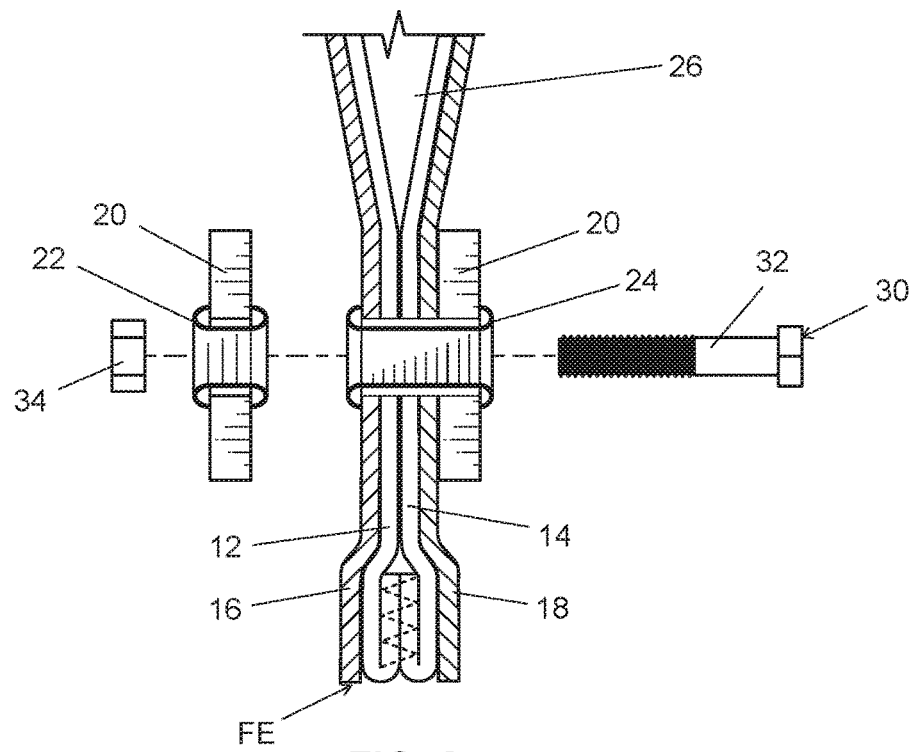
FIG. 2 is a simplified schematic partially exploded cross-sectional top view of a portion of the end of the auxiliary container of FIG. 1.

An example auxiliary container 10 for connection to a shopping cart is illustrated in FIGS. 1-8. The auxiliary container 10 includes first and second walls 12, 14 with each wall having a top T, bottom B, first end FE and second end SE. The bottoms B of the first and second walls 12, 14 are connected to each other, forming a bottom of the container 10. The first ends FE of the first and second walls 12, 14 are connected to each other and the second ends SE of the first and second walls 12, 14 are connected to each other, so as to form a container that may otherwise be referred to as a bag or pouch. The connections at the respective first and second ends FE, SE may be by sewing, mechanical fastener, adhesive or the like, resulting in an internal or external generally vertical seam. A reinforcement band 16, 18 is connected along the top T of each of the respective first and second walls 12, 14. At least first and second straps 20, 20' are spaced inward from the first and second ends FE, SE and connected to and extending from the reinforcement band 16 at the top T of the first wall 12. The first strap 20 has at least a first grommet 22 passing through the first strap 20 at a location spaced from the top T of the first wall 12 and having at least a second grommet 24 passing through the first strap 20, the reinforcement band 16 along the top T of the first wall 12, the first wall 12, the second wall 14 and the reinforcement band 18 along the top T of the second wall 14, as seen in FIG. 2 in a simplified schematic partially exploded cross-sectional top view of a portion of the end of the auxiliary container 10 through the first and second grommets 22, 24. The second strap 20' has at least a first grommet 22' passing through the second strap 20' at a location spaced from the top T of the first wall 12 and having at least a second grommet 24' passing through the second strap 20', the reinforcement band 16 along the top of the first wall 12, the first wall 12, the second wall 14 and the reinforcement band 18 along the top T of the second wall 14.

An opening 26 to the container 10 is provided between the respective first and second walls 12, 14 and between the respective second grommets 24, 24'. The tops T of the first and second walls 12, 14 and the reinforcement bands 16, 18 also preferably are connected, such as by sewing, mechanical fastener, adhesive or the like, in the regions between the second grommets 24, 24' and the respective first and second ends FE, SE of the container 10, so as to prohibit access to the container 10 other than through the opening 26, and to further reinforce and protect the connections of the first and second walls 12, 14 at the first and second ends FE, SE from excessive stress. The second grommets 24, 24' also serve to reinforce the ends of the opening in a manner that protects against excessive stress to and splitting of the seams at the first and second ends FE, SE of the container 10.

The first and second walls 12, 14 of the auxiliary container 10 are constructed of flexible material, which is a flexible mesh material. The flexible mesh material of the first and second walls 12, 14 may be made of nylon fabric, polyester fabric or other suitable mesh fabric having holes therein that permit viewing and drainage of liquid through the material and the material tends to be stable in ultraviolet (UV) light and water resistant. Viewing through the first and second walls 12, 14 is helpful to a retailer to be able to confirm that a customer is not attempting to conceal and improperly remove goods from a store without paying for them. Viewing through the first and second walls 12, 14 is helpful to a customer who is using an auxiliary container 10 that is connected to a shopping cart to be able to keep track of items already selected, and to serve as a reminder to empty the container 10 when placing items at a checkout to complete a purchase. Water resistance and drainage of liquid is helpful to a retailer because shopping carts often may be exposed to rain or snow when used outdoors, and permits quick cleaning and or rinsing, if needed.

A particularly efficient construction of the auxiliary container 10 may include having the first and second walls 12, 14 be integrally formed by a single sheet of material that is folded over at the bottoms B of the first and second side walls 12, 14 to form a bottom 28 of the auxiliary container 10, as seen in FIG. 3, which is a simplified partial cross-sectional view of the second end SE of the mesh portion of the auxiliary container 10. The first and second walls 12, 14 formed when the single sheet of material is folded over also may be connected together at the first and second ends FE, SE, such as by sewing, use of adhesive, heat sealing or the like.

The reinforcement bands 16, 18 are constructed of flexible material that may be made of nylon fabric, polyester fabric or other suitable fabric that tends to be UV stable and water resistant. Each of the first and second straps 20, 20' extending from the reinforcement band 16 at the top T of the first wall 12 also is constructed of flexible material that may be made of nylon fabric, polyester fabric or other suitable fabric that tends to be water resistant. Each of the at least first and second straps 20, 20' extending from the reinforcement band 16 at the top T of the first wall 12 is configured for connection to a substantially horizontal element of a shopping cart via installation of a fastener 30 through the first and second grommets 22, 24 and 22', 24' that extend through the respective straps 20, 20'. To keep the containers 10 from being unlawfully removed from shopping carts, the fastener 30 that is installed through the respective first and second grommets of a respective strap 20, 20' are relatively tamper proof, such as use of threaded bolts 32 with locking nuts 34, zip ties, cable rings, rivets, or the like.

Figure 4:
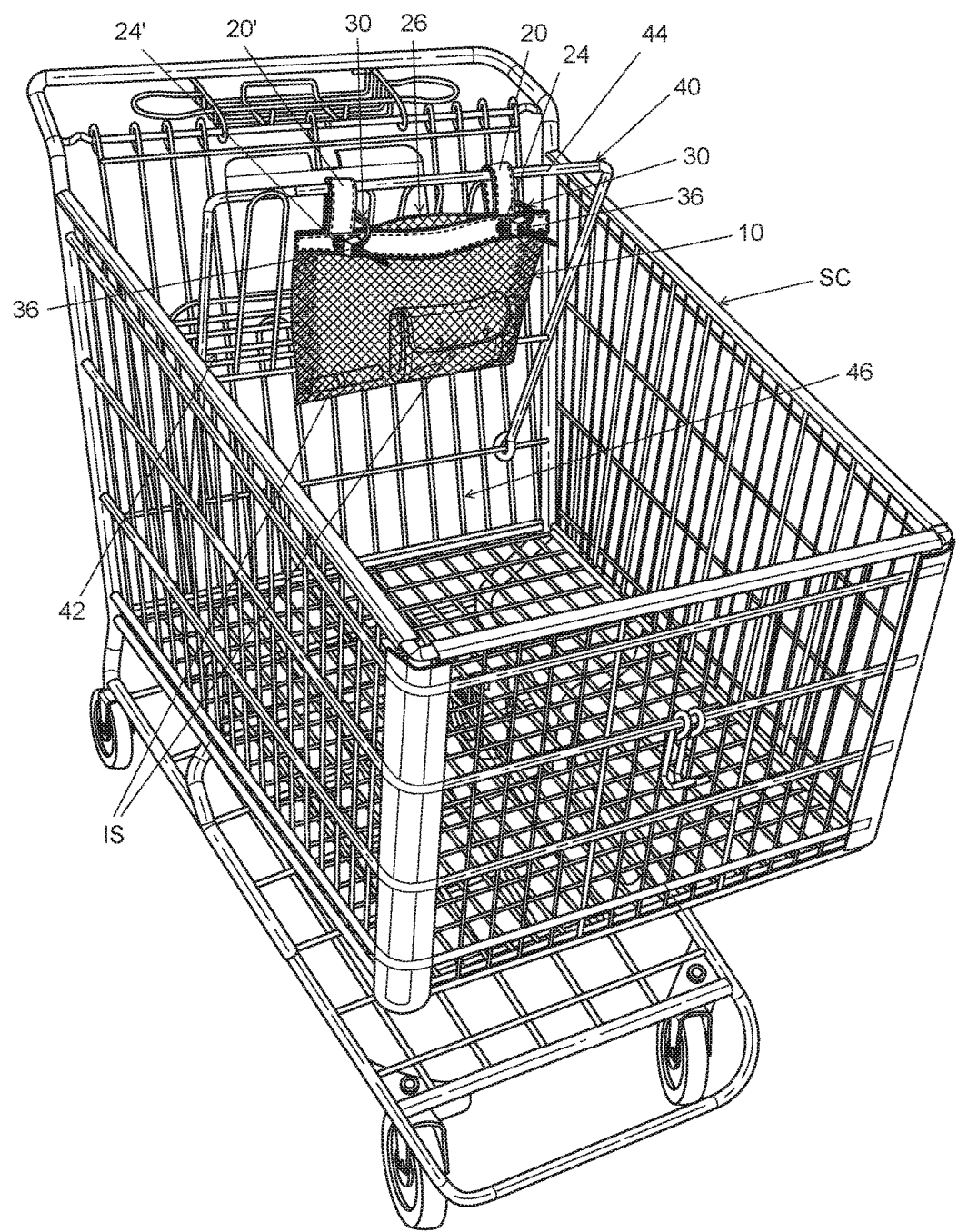
FIG. 4 is an upper front perspective view of the auxiliary container of FIG. 1 connected at an internal location to a pivotal seat portion of a first example shopping cart and containing small items.

Turning to examples of installed locations, in FIG. 4, the auxiliary container 10 is connected to a pivotal seat portion 40 of a first example shopping cart SC at a location that is within or internal to the shopping cart SC. This represents a typical metal shopping cart that includes an upper area in front of the main handle where a seat portion 40 may be pivoted forward to provide a seat 42 for a toddler. In this example, the auxiliary container 10 has the straps 20, 20' looped over a top rod 44 of the pivoted seat portion 40 and fasteners 30 connect through the respective aligned first and second grommets. The fasteners 30 may be intended to be tamper proof, and are shown as heavy duty zip ties 36.

The example auxiliary container 10 of FIG. 4 is shown as containing small items, such as lipstick and a pocket book, which represents the ability of the flexible material of the container 10 to accommodate and see the small items. As such, a user may easily and conveniently place small objects or items IS within the container 10 through the opening 26 while shopping and then equally conveniently retrieve the items IS through the opening 26 when it is necessary to complete the purchase of the items IS. When nesting multiple shopping carts SC, the rear wall 46 of the shopping cart SC will be forced to pivot upward and forward, thereby causing the pivotal seat portion 40 to lie adjacent the rear wall 46 as the front basket portion of another cart moves into a nested position through the area previously occupied by the rear wall 46. It will be appreciated that when the pivotal seat portion 40 and rear wall 46 are pivoted upward and forward, the auxiliary container 10 that is located forward of the pivotal seat portion 40 will be pushed upward and out of the way, as well.

FIG. 5 provides an example of the auxiliary container 10 connected to a main handle 50 at the rear of the first example shopping cart SC. This location is external to the shopping cart SC and advantageously places the auxiliary container 10 closest to the user, while having the straps 20, 20' looped over the main handle. This permits freedom of the auxiliary container 10 to swing up and out of the way when shopping carts SC are nested. Thus, the auxiliary container 10 and rear wall 46 will swing upward and forward when pushing one shopping cart SC into a nested position relative to another shopping cart SC. The fasteners 30 may be intended to be tamper proof, and may be the threaded bolts with locking nuts, such as are shown in FIG. 2, or the like.

Figure 6:
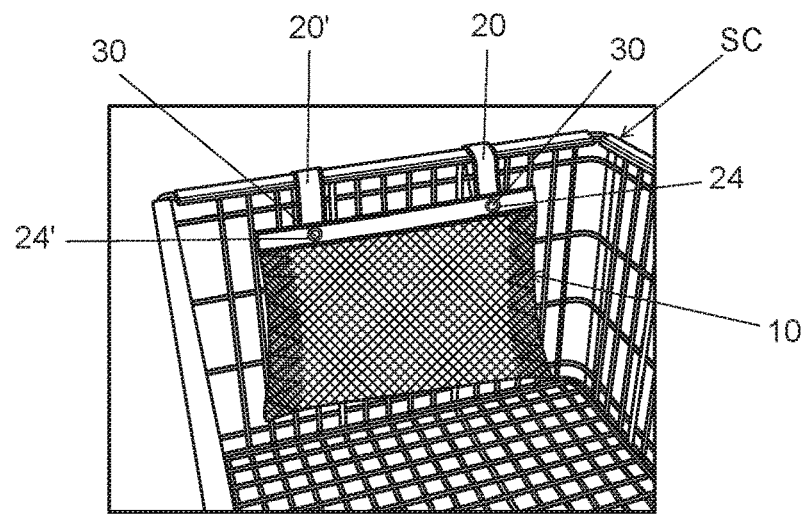
FIG. 6 is rear perspective view of the auxiliary container of FIG. 1 connected at an internal location to the front wall of the first example shopping cart.

Turning to FIG. 6, an auxiliary container 10 is shown connected to the front wall 60 at an internal location on the first example shopping cart SC. This location also permits shopping carts to be nested, without obstruction by the auxiliary container 10. The fasteners 30 in this example also may be intended to be tamper proof, and may be rivets, or the like.

Figure 7:
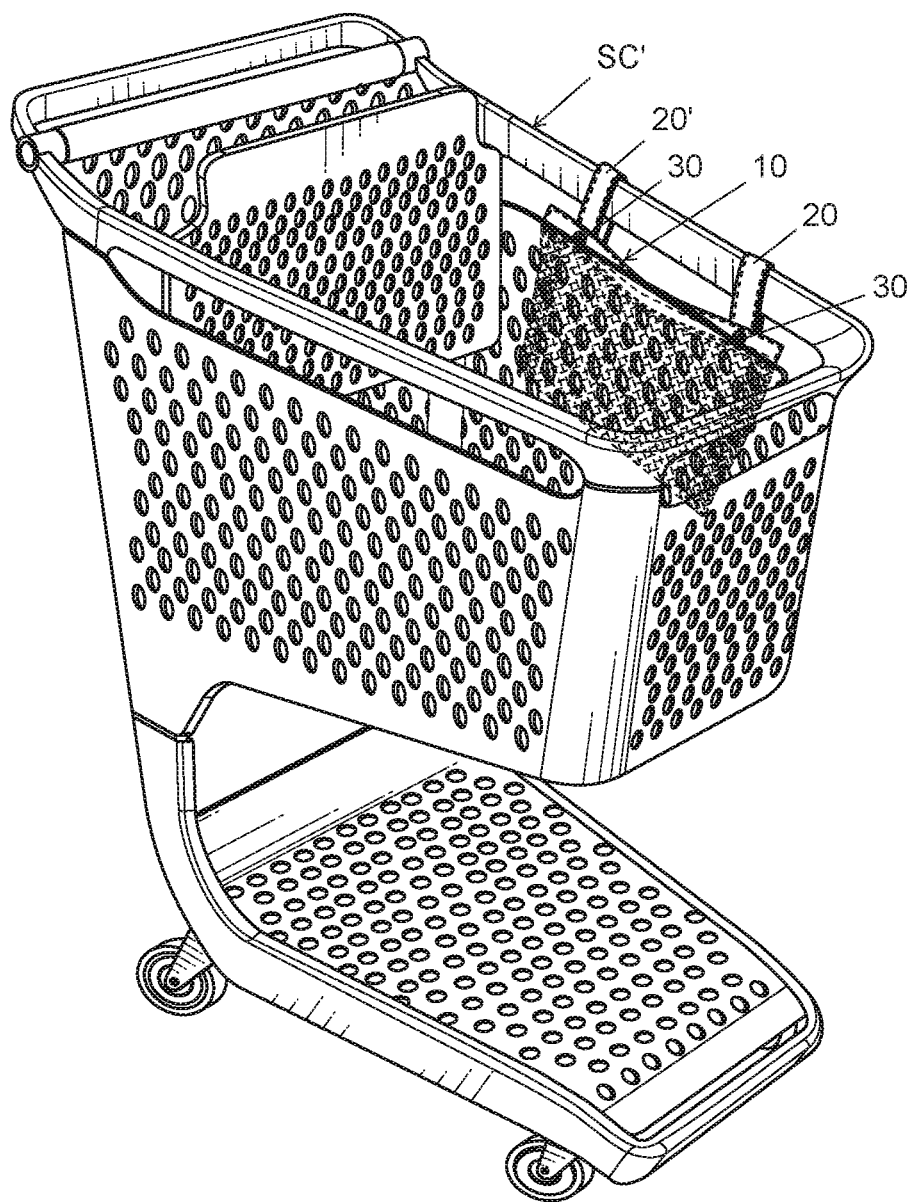
FIG. 7 is side perspective view of the auxiliary container of FIG. 1 connected at an external location to a side wall of a second example shopping cart.

FIG. 7 shows an auxiliary container 10 installed on a second example shopping cart SC', along a side wall and external to the shopping cart SC'. In this example, the fasteners 30 may be threaded bolts and nuts, with the threaded bolts passing through the respective first and second grommets 22, 24 and 22', 24 (as best seen in FIG. 2), when installed. The shopping cart SC' includes formed plastic panels connected to a metal or plastic frame with wheel assemblies. In this example, the auxiliary container 10 hangs adjacent the outside of a side wall of the basket of the shopping cart SC' from an upper side rail of the shopping cart SC'. This location similarly permits nesting of a series of shopping carts.

Figure 8:
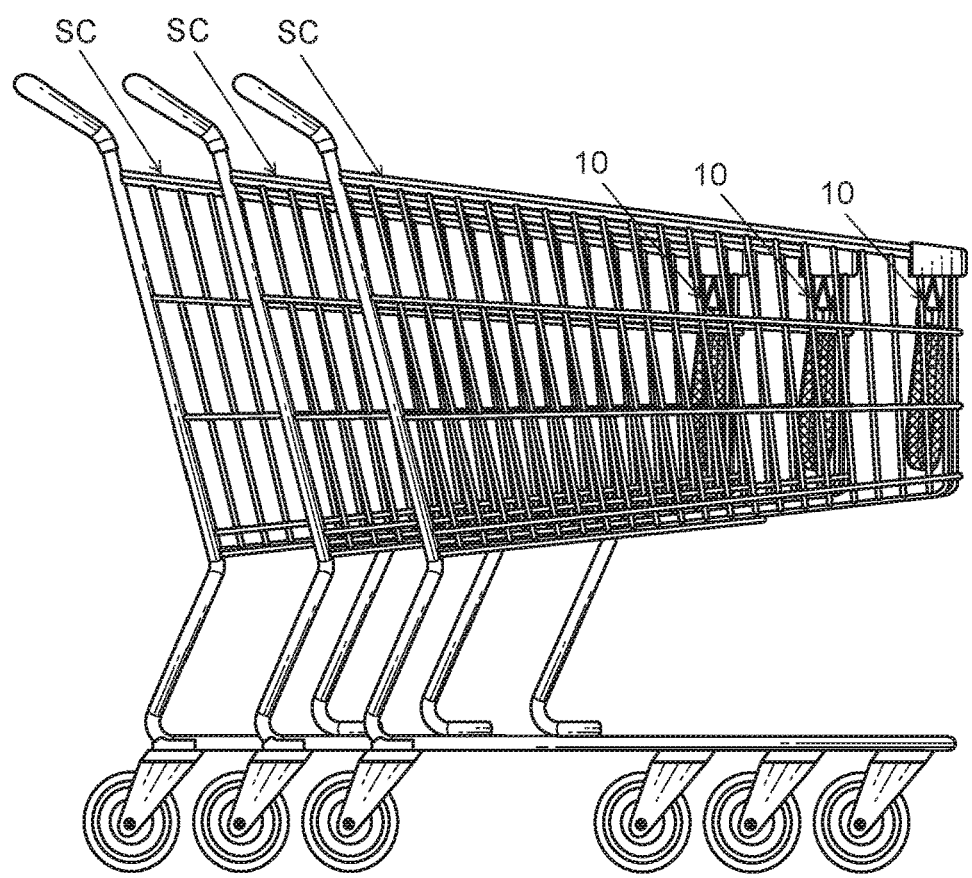
FIG. 8 is side perspective view of a nested series of three of the first example shopping carts with an auxiliary container of FIG. 1 connected at an internal location to the front wall of each cart.

FIG. 8 shows the above mentioned situation from FIG. 6 wherein an auxiliary container 10 is installed at an internal location adjacent the front wall 60 of a shopping cart SC, and a series of three shopping carts SC are nested without having to be concerned about the presence of the auxiliary container 10.

The above discussed structure of the auxiliary container 10 provides for numerous advantages. As previously noted, the container 10 being made of flexible nylon mesh fabric provides for better resistance to ultraviolet light, harsh weather conditions, finger prints or smudges, and the ability to be cleaned potentially simply by being subjected to rain or by conveniently spraying or wiping the fabric. The auxiliary container 10 also permits ease of depositing and withdrawing small items through a reinforced opening 26, while being able to readily see the items, thereby increasing the likelihood that the items will be properly accounted for during shopping and when placing items on a checkout counter. The auxiliary container also is equipped to be connected to a shopping cart internally or externally, at multiple convenient locations.

While the present disclosure shows and discusses example auxiliary containers that may be adapted for use and installation in various locations on a variety of shopping carts. These examples are merely illustrative and are not to be considered limiting. It will be apparent to those of ordinary skill in the art that various auxiliary containers may be constructed to be installed on shopping carts in any one of several convenient positions without departing from the scope or spirit of the present disclosure. Thus, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An auxiliary container for a shopping cart, comprising: first and second walls with each wall having a top, bottom, first end and second end; the bottoms of the first and second walls being connected to each other; the first ends of the first and second walls being connected to each other; the second ends of the first and second walls being connected to each other; a reinforcement band connected along the top of each of the respective first and second walls; at least first and second straps spaced inward from the first and second ends and connected to and extending from the reinforcement band at the top of the first wall; the first strap having at least a first grommet passing through the first strap at a location spaced from the top of the first wall and having at least a second grommet passing through the first strap, the reinforcement band along the top of the first wall, the first wall, the second wall and the reinforcement band along the top of the second wall; the second strap having at least a first grommet passing through the second strap at a location spaced from the top of the first wall and having at least a second grommet passing through the second strap, the reinforcement band along the top of the first wall, the first wall, the second wall and the reinforcement band along the top of the second wall; and wherein an opening to the container is provided between the respective first and second walls and between the respective second grommets.

2. The auxiliary container of claim 1 wherein the first and second walls are constructed of flexible material.

3. The auxiliary container of claim 2 wherein the flexible material of the first and second walls is a flexible mesh material.

4. The auxiliary container of claim 3 wherein the flexible mesh material of the first and second walls is made of nylon fabric.

5. The auxiliary container of claim 1 wherein the first and second walls are integrally formed by a single sheet of material that is folded over to form the bottom of the auxiliary container.

6. The auxiliary container of claim 5 wherein the first and second walls formed when the single sheet of material is folded over are connected together at the first and second ends.

7. The auxiliary container of claim 1 wherein the reinforcement bands are constructed of flexible material.

8. The auxiliary container of claim 7 wherein the flexible material of the reinforcement bands is made of nylon fabric.

9. The auxiliary container of claim 1 wherein each of the at least first and second straps extending from the reinforcement band at the top of the first wall is constructed of flexible material.

10. The auxiliary container of claim 9 wherein the flexible material of each of the at least first and second straps extending from the reinforcement band at the top of the first wall is made of nylon fabric.

11. The auxiliary container of claim 1 wherein each of the at least first and second straps extending from the reinforcement band at the top of the first wall is configured for connection to a substantially horizontal element of a shopping cart via installation of a fastener through the first and second grommets that extend through the respective first and second straps.

12. The auxiliary container of claim 11 wherein the fastener is relatively tamper proof.

13. An auxiliary container for a shopping cart, comprising: first and second walls constructed of flexible mesh material with each wall having a top, bottom, first end and second end; the bottoms of the first and second walls being connected to each other; the first ends of the first and second walls being connected to each other; the second ends of the first and second walls being connected to each other; a reinforcement band constructed of flexible material connected along the top of each of the respective first and second walls; at least first and second straps spaced inward from the first and second ends constructed of flexible material and connected to and extending from the reinforcement band at the top of the first wall; the first strap having at least a first grommet passing through the first strap at a location spaced from the top of the first wall and having at least a second grommet passing through the first strap, the reinforcement band along the top of the first wall, the first wall, the second wall and the reinforcement band along the top of the second wall; the second strap having at least a first grommet passing through the second strap at a location spaced from the top of the first wall and having at least a second grommet passing through the second strap, the reinforcement band along the top of the first wall, the first wall, the second wall and the reinforcement band along the top of the second wall; wherein an opening to the container is provided between the respective first and second walls and between the respective second grommets; and wherein each of the at least first and second straps extending from the reinforcement band at the top of the first wall is configured for connection to a substantially horizontal element of a shopping cart via installation of a fastener through the first and second grommets that extend through the respective strap.

14. The auxiliary container of claim 13 wherein the flexible mesh material of the first and second walls is made of nylon fabric.

15. The auxiliary container of claim 13 wherein the first and second walls are integrally formed by a single sheet of material that is folded over to form the bottom of the auxiliary container.

16. The auxiliary container of claim 13 wherein the first and second walls formed when the single sheet of material is folded over are connected together at the first and second ends.

17. The auxiliary container of claim 13 wherein the flexible material of the reinforcement bands is made of nylon fabric.

18. The auxiliary container of claim 13 wherein the flexible material of each of the at least first and second straps extending from the reinforcement band at the top of the first wall is made of nylon fabric.

* * * * *